United States Patent [19]

Lovegrove

[11] Patent Number: 4,601,334

[45] Date of Patent: Jul. 22, 1986

[54] CONTROL LINE PROTECTOR FOR OIL WELL TUBING STRING

[75] Inventor: Peter J. Lovegrove, Lowestoft, United Kingdom

[73] Assignee: Weatherford/Lamb, Inc., Houston, Tex.

[21] Appl. No.: 597,852

[22] Filed: Apr. 9, 1984

[30] Foreign Application Priority Data

Apr. 7, 1983 [GB] United Kingdom ............... 8309424

[51] Int. Cl.⁴ .............................................. F16L 3/22
[52] U.S. Cl. ..................................... 166/241; 174/47; 285/119; 285/419; 285/411; 138/110; 24/279; 175/325
[58] Field of Search ................. 285/119, 373, 45, 411, 285/137 R, 419; 174/47, 136; 248/74.1, 74.4; 138/106, 110, 111, 103; 166/241; 175/325; 308/4 A; 24/20 LS, 277, 265 L, 276, 279

[56] References Cited

U.S. PATENT DOCUMENTS

| | | | |
|---|---|---|---|
| 2,829,190 | 4/1958 | Comlossy | 174/47 |
| 2,858,093 | 10/1958 | Knoll | 174/47 |
| 3,757,387 | 9/1973 | Bush et al. | 166/241 |
| 3,843,168 | 10/1974 | Morrill et al. | 285/411 |
| 4,068,088 | 1/1978 | Smith | 174/36 |
| 4,068,966 | 1/1978 | Johnson et al. | 174/47 |
| 4,422,504 | 12/1983 | Moore | 174/47 X |
| 4,445,255 | 5/1984 | Olejak | 138/106 X |
| 4,484,785 | 11/1984 | Jackson | 138/110 X |

FOREIGN PATENT DOCUMENTS

45603  3/1956  Fed. Rep. of Germany ...... 285/419

Primary Examiner—Dave W. Arola
Attorney, Agent, or Firm—Fulbright & Jaworski

[57] ABSTRACT

A control line protector for securing and protecting a control line or lines to the exterior of an oil well tubing string. The protector comprises a flexible steel strap to the ends of which a respective trunnion is attached, one of which trunnions is removably mounted. The trunnions are interconnected by two screws which may be rotated to draw the trunnions towards one another, thus tensioning the strap around a length of tubing forming part of a drill string. An axially-directed channel is formed adjacent one of the trunnions to receive a control line.

12 Claims, 12 Drawing Figures

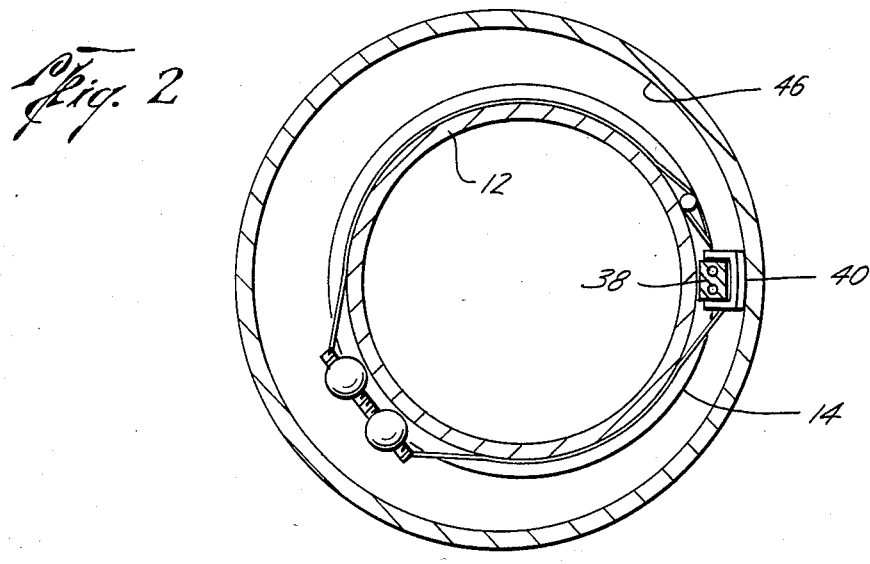
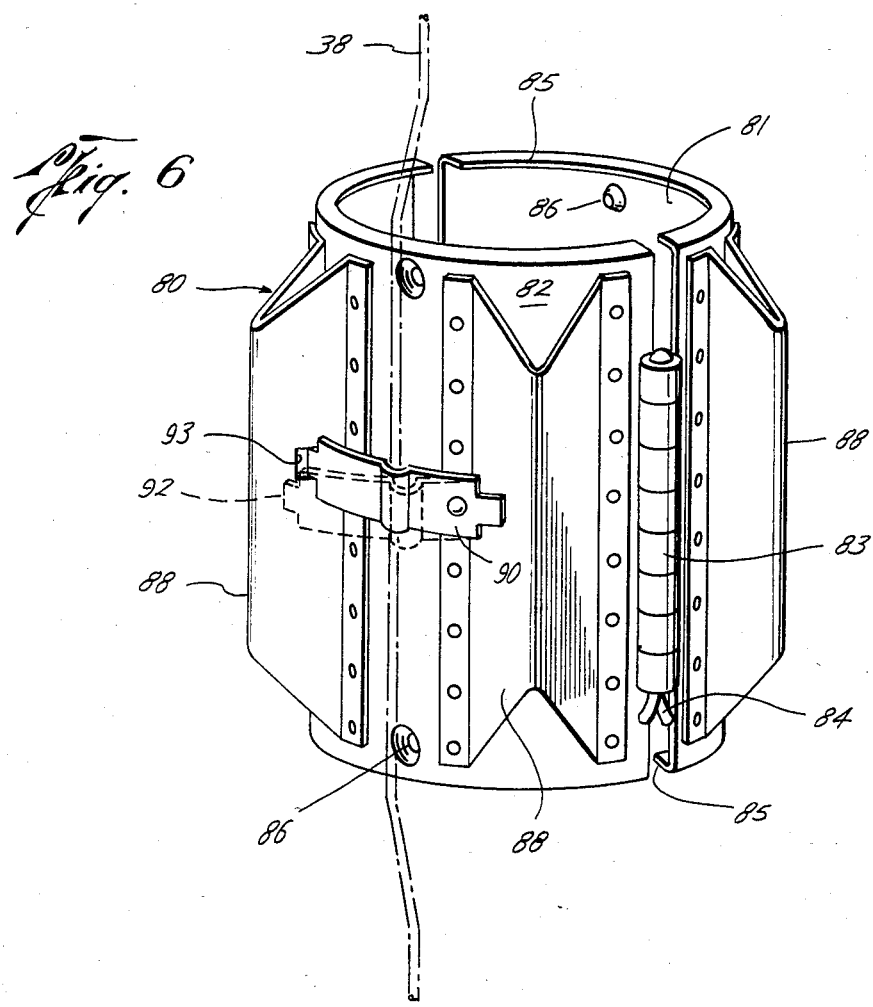

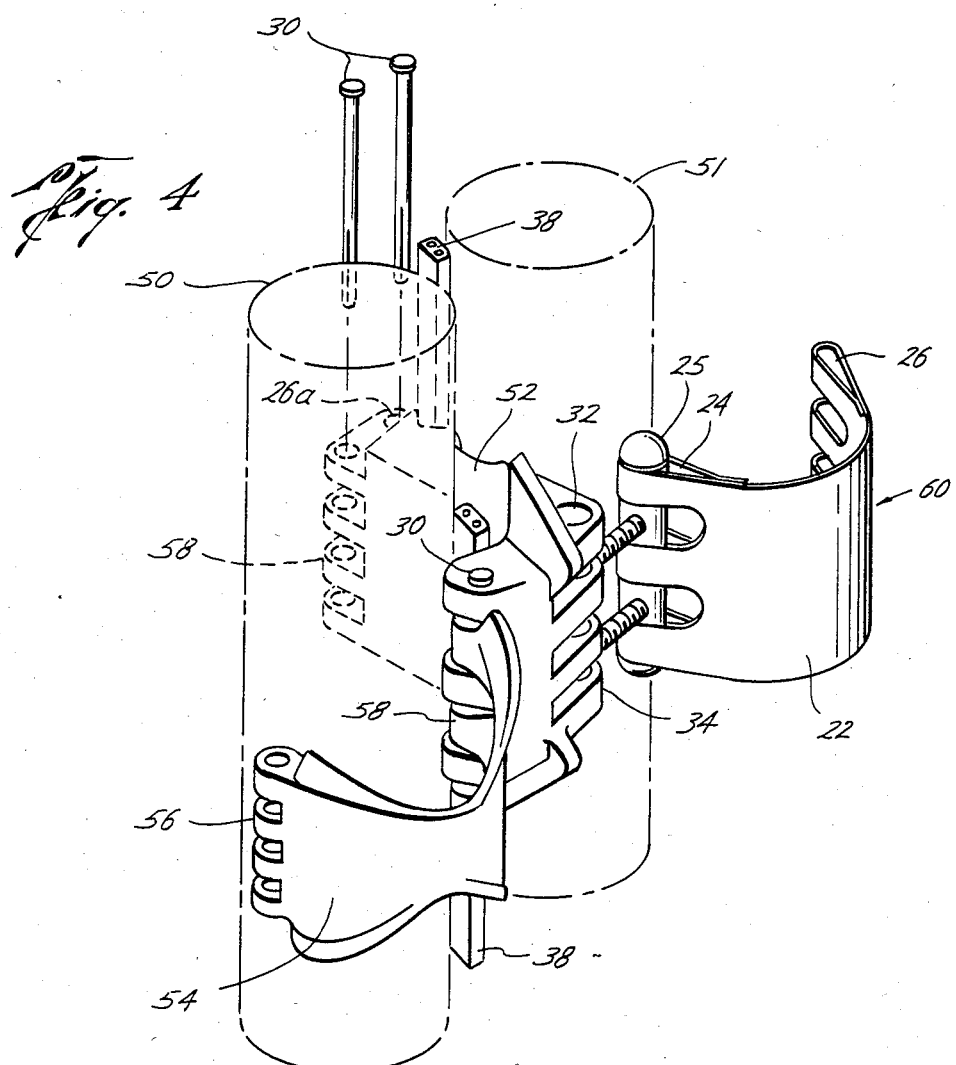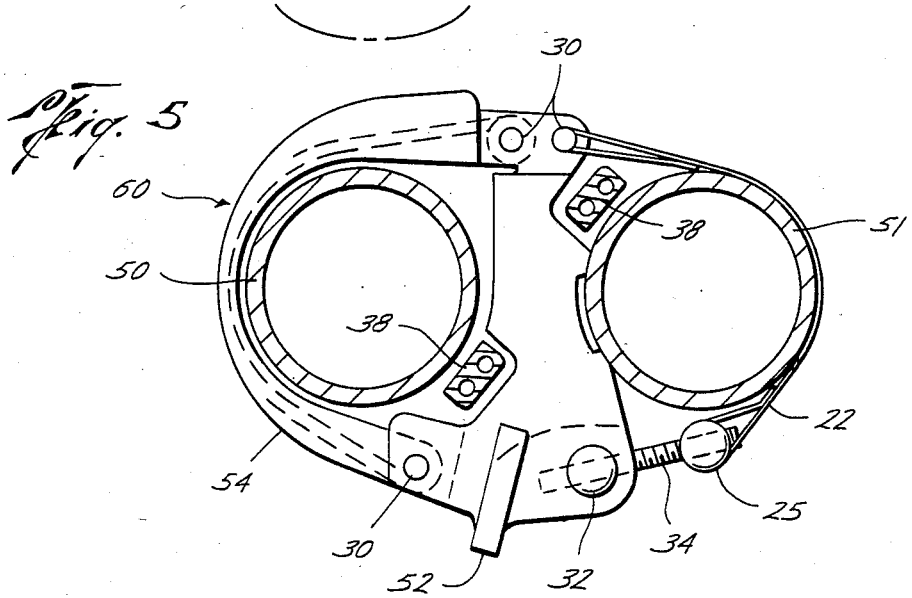

CONTROL LINE PROTECTOR FOR OIL WELL TUBING STRING

BACKGROUND OF THE INVENTION

This invention relates to means for securing a control line or lines to the exterior of a pipe, typically a control line protector for an oil well tubing string.

A typical producing oil well has a tubing string running inside a metal lined hole. Most producing wells have control valves installed in the tubing down hole. These valves, which may be hydraulically or electrically operated, require control lines to be run from the surface down the well alongside the tubing string. Also, control lines (including control cables) for submersible pumps have to be run similarly from the surface, and may be round or rectangular. Most tubing used for down hole completion is jointed approximately every 10 to 12 meters, the joints resulting in a local increase in diameter of the tubing string. Since the metal lined hole within which the tubing string runs is normally of constant diameter, there is accordingly a constriction of the annular space between the tubing string and the hole in the region of each joint.

A control line running the length of the tubing string externally thereof requires protection against being trapped between the joints and the inside of the hole, especially when lowering or pulling the tubing string in the well, and also requires attachment to the tubing string at intervals to prevent excessive slackness and to provide local support for the weight of the control line.

The known control line protectors suffer from various disadvantages. A typical prior art control line protector comprises a rigid steel casing consisting of two identical halves which are hinged together ready for assembly over the tubing string. Locking caps on one of the half members are deformed in engagement with the other member to secure the protector in position. The inner surface of one or both of the halves is formed with a channel or groove through which the control line or lines are led. No means is provided for adjusting the clamping pressure, and after a period of time the protector may loosen on the tubing string. Should this occur there is a danger that the protector may rotate on the tubing string such that the control lines may become trapped between the protector and a joint leading to the control lines being damaged or even severed.

SUMMARY

An object of the present invention is to provide an improved control line protector which can be fitted securely and reproducably to a tubing string, and which will reliably secure and protect control lines when fitted externally to a tubing string.

A further object of the present invention is to provide an improved control line protector which can be fitted to a dual tubing string and will also function as an anticorkscrewing device.

Yet another object of the present invention is to provide an improved control line protector which will also serve for centering a tubing string in a well casing.

According to one aspect of the present invention a control line protector comprises a part cylindrical member for application to a tubing string, a strap, respective means for connecting the strap to the ends of the member, means for locating a control line or lines within the perimeter of the strap and the member, the means connecting one end of the member to the strap comprising releasable hinge means having a removable pin and the means connecting the other end of the member to the strap comprising trunnions mounted one in each of the adjacent ends of the strap and member and clamping screws extending between the trunnions and adjustable for drawing the strap into clamping engagement with the tubing string.

According to another aspect of the present invention a control line protector for a dual tubing string comprises a spacer member positionable between the tubing strings, a bracket hingedly connected to the spacer member for surrounding one tubing string, and a strap releasably connected to the other member by hinge means having a removable pin and by clamping screws adjustable for drawing the spacer member and the strap into clamping engagement with the other tubing string, and means for locating a control line or lines within the perimeter of the protector.

According to a still further aspect of the present invention, a control line protector for centering a tubing string within a well casing comprises two semi-cylindrical members releasably connected together, locating means for locating the members in a predetermined axial position with respect to the tubing string, and means for securing a control line or control lines to at least one of the said members.

Other and further objects, features, and advantages will be apparent from the following description of presently preferred embodiments of the invention, given for the purpose of disclosure and taken in conjunction with the accompanying drawings.

BRIEF DESCRIPTION OF THE DRAWINGS

FIG. 2 is a schematic plan view showing a first embodiment of control line protector according to the invention fitted to a tubing string;

FIG. 4 is a perspective view showing a second embodiment of control line protector according to the invention designed for installation on a dual tubing string, shown in process of being fitted to the tubing string;

FIG. 5 is a plan view of the installed control line protector of FIG. 4; and

FIG. 6 is a perspective view of a third embodiment of control line protector.

DESCRIPTION OF THE PREFERRED EMBODIMENTS

Figure 1C:
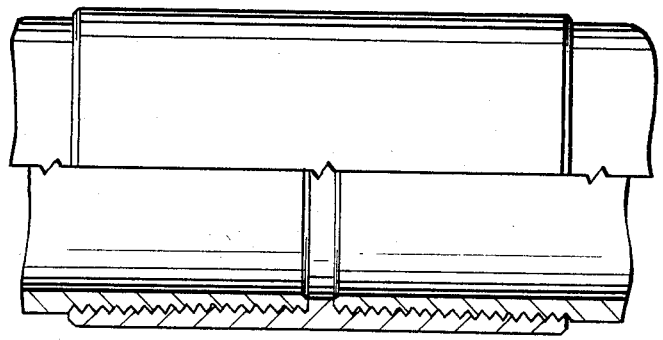
FIGS. 1a to 1c illustrate typical joint formations between tubing lengths in a tubing string of a production oil well.
Figure 1B:
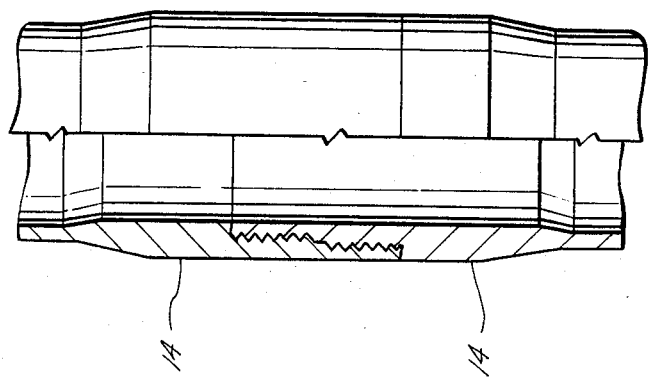
Figure 1A:
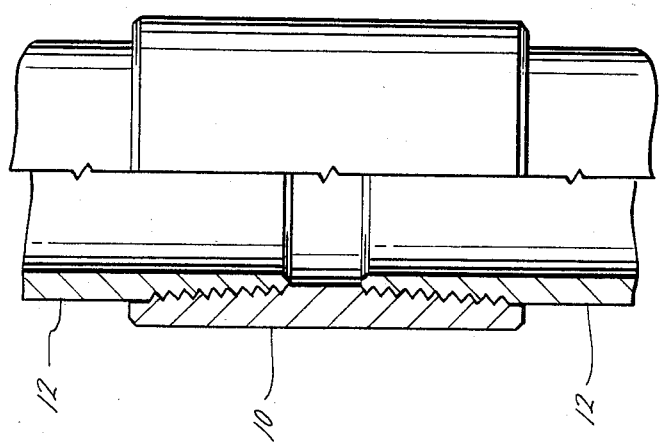

FIG. 1a shows one form of joint in a tubing string of an oil well. Tubing lengths 12 are interconnected by a threaded collar 10 the external diameter of which is greater than the external diameter of the tubing lengths 12.

FIG. 1b shows another form of joint wherein the ends of the tubing lengths 14 are thickened and screw-threaded for mutual interengagement. Again the external diameter of the tubing string at the joint is greater than the external diameter intermediate the joint.

FIG. 1c shows another form of joint resembling that of FIG. 1a.

Figure 3B:
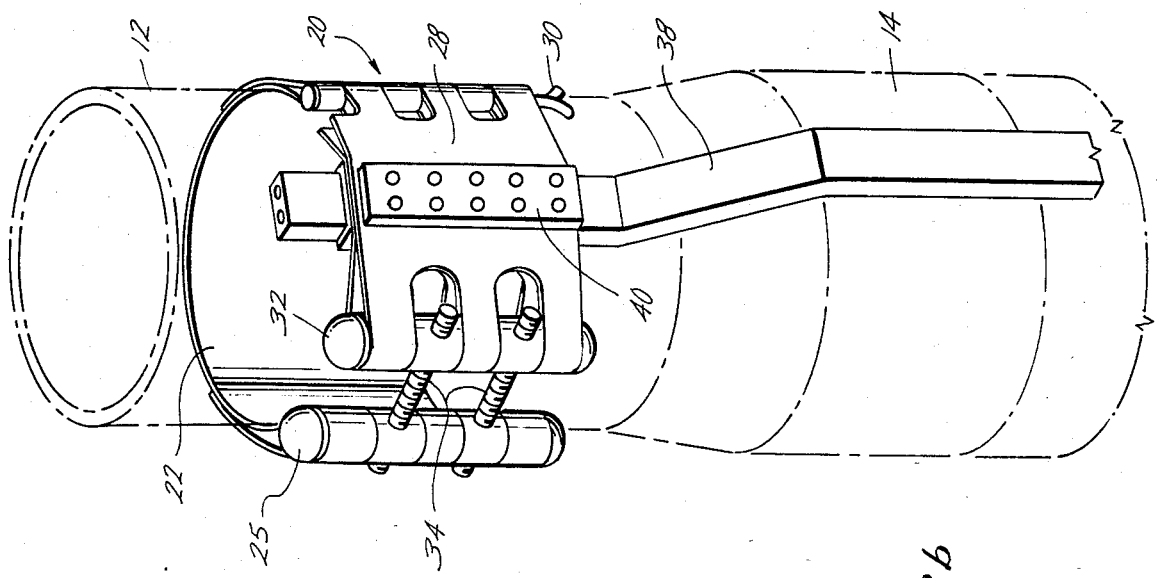
FIG. 3b shows the control line protector as installed.
Figure 3A:
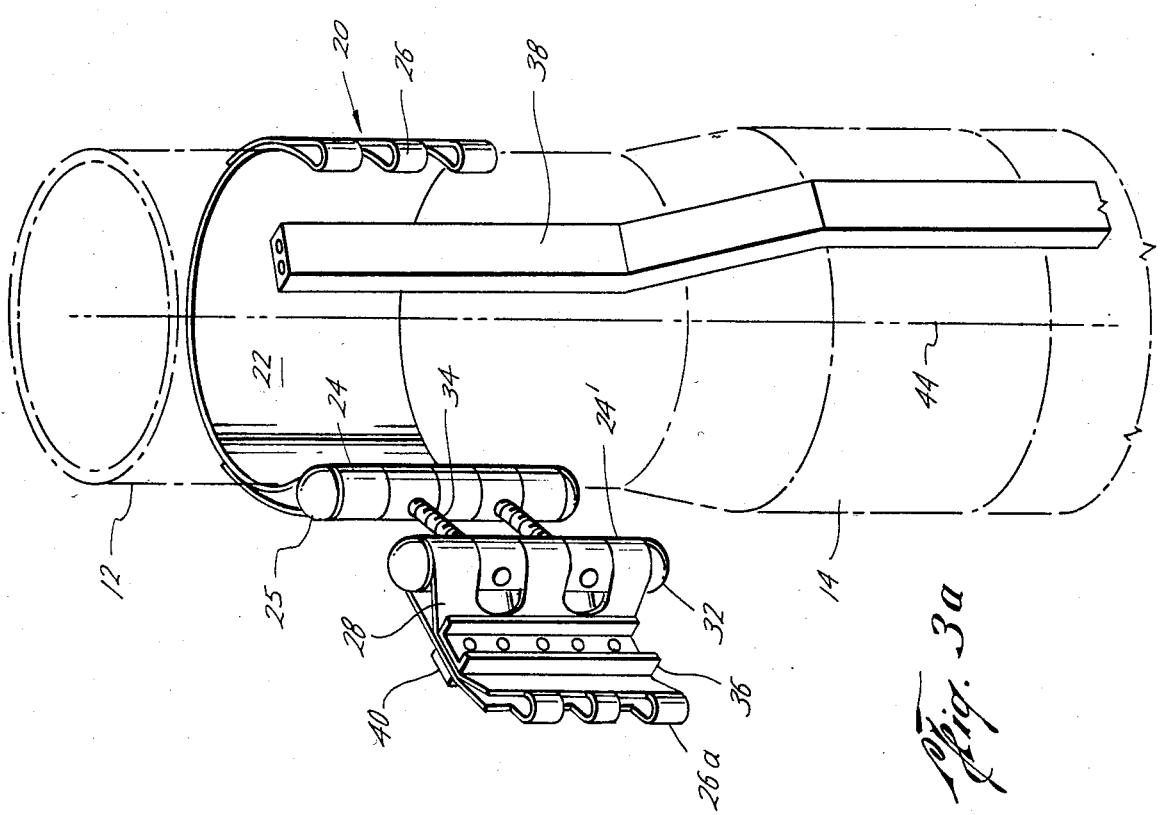
FIG. 3a is a perspective view showing the control line protector of FIG. 2 in process of being fitted to the tubing string.

A first embodiment of a control line protector according to the invention is shown in FIGS. 2, 3a and 3b of the drawings. In FIG. 3a the control line protector 20 is shown in the process of being installed on a tubing length 10 adjacent to a joint 14.

The control line protector 20 comprises a flexible steel band or strap 22 formed at one end with a plurality of eyes 24 in which a trunnion 25 is pivotally mounted. The other end of the strap 22 is formed with eyes 26, and a second strap member 28 is formed at one end with eyes 26a dimensioned to cooperate with the eyes 26 and form therewith a hinge in which a pin 30 can be inserted. The other end of the second strip 28 is formed with eyes 24' in which a second trunnion 32 is pivotally mounted. The trunnions 25 and 32 are interconnected by two screws 34, which screws are threadedly engaged in the trunnion 32 and are captive but rotatable in the trunnion 25.

Secured to the strap 28 approximately midway between its ends is a channel 36 which accepts a control line 38, here shown as a multiple encapsulated control line. A rubbing strip 40 is secured to the outer face of the strap 28, opposite the channel 36.

The straps 22 and 28 are preformed to substantially the required curvature according to the diameter of the tubing length 12, and the strap 22 has a circumferential extent of typically 270°.

To install the control line protector 20 on the tubing string, it is opened out as shown in FIG. 3a and the strap 22 is offered around the tubing 12. The strap 22 is sufficiently flexible and elastic to enable it to snap over the tubing diameter. Then the strap 28 is closed over the control line 38, the control line being positioned within the clamping channel 36, and the eyes 26, 26a are brought into cooperating relationship. The pin 30 is then inserted and locked in position by deforming the projecting end. The hinge formed with the detachable pin 30 allows the protector to be passed initially around the tubing without removing the screws 34.

The protector is then tensioned by tightening the screws 34 to a predetermined torque. The magnitude of the torque applied to the screws determines the order of resistance of the control line protector to an applied axial load and to rotation about the centre axis of the tubing string.

FIG. 3b shows the fitted and installed control line protector 20.

The rubbing strip 40 projects a sufficient distance from the axis 44 of the tubing string to protect the control line 38 from being trapped between the joint 14 and the metal casing 46 of the well hole even with the tubing displaced off-centre within the hole, see FIG. 2.

Figure 3C:
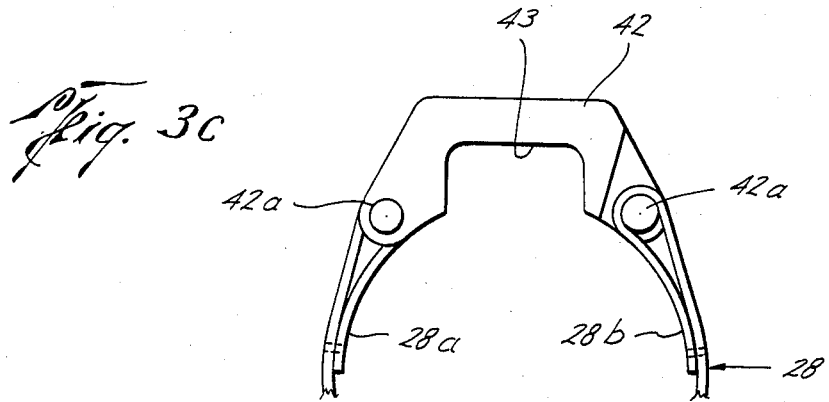
FIGS. 3c to 3e respective detail modifications to the control line protector of FIGS. 2 to 3b.
Figure 3D:
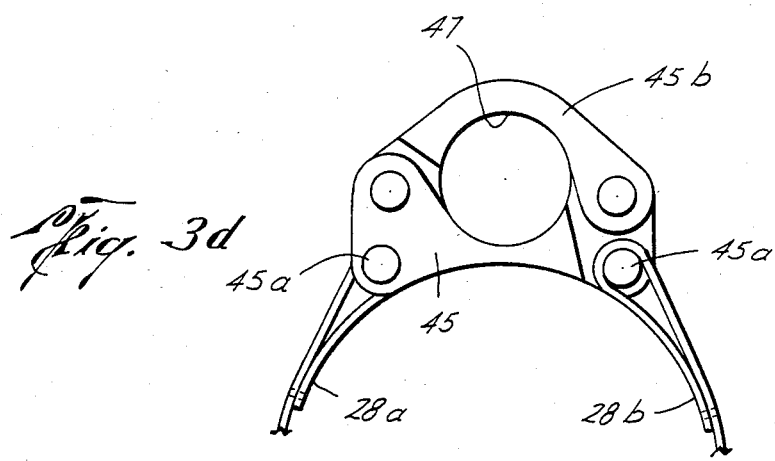
Figure 3E:
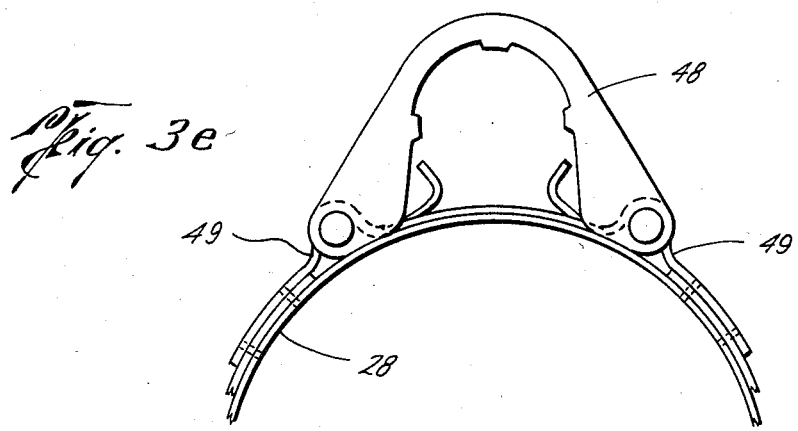

FIGS. 3c to 3e illustrate modifications to the strap 28 which enable the control line protector to accommodate control lines and/or cable of greater dimensions.

According to the modifications, the clamping channel 36 and the rubbing strip 40 are replaced by a cast clamping member having a recess which is appropriately dimensioned to accept the control lines and/or cables and which acts as an integral rubbing strip.

FIG. 3c illustrates a modification comprising a cast clamping member 42 having a recess 43 suitable for accepting an encapsulated control line. In conjunction with this modification, the strap 28 is provided in two portions 28a and 28b which are hingedly connected to the cast clamping member 42 by pins 42a.

FIG. 3d illustrates a further modification in which the clamping member is in the form of a two-part member comprising an inner part 45 hingedly connected to the strap portions 28a and 28b by pins 45a, and an outer part 46b hinged to the inner part 45. The outer part 45b can be opened to allow the control lines and/or an armoured cable to be positioned in the recess 47 after the control line protector has been installed on the tubing string. The cast parts 45 and 45b may have cable location ridges cast into the internal profile defining the recess 47.

FIG. 3e illustrates a modification which provides a large tolerance on control lines and has internal helical upsets to locate a spiral control line casing. The cast clamping member 48 is substantially U-shaped and is connected to tags 49 which are riveted to the outer face of the strap 28.

Some oil wells employ dual tubing strings, that is two tubing strings of equal diameter which are run inside a metal cased well hole. Each tubing string has its own control line running down the outside, and requires some means whereby the control lines are prevented from being trapped in the space between the two tubing strings in the event of the tubing flexing. Additionally, each tubing string complete with its control line is subjected to axial movement relative to the other and must therefore be free from constraint in the longitudinal direction relative to the other. However, if completely unrestrained the tubing strings would tend to corkscrew in the hole, namely twist one around the other.

FIGS. 4 and 5 show an embodiment of an all steel control line protector specifically designed for use on such dual tubing string comprising tubing lengths 50 and 51. The control line protector 60 shown is designed to maintain a specified center to center distance between the strings 50 and 51 whilst at the same time maintaining the position of control lines 38 in close proximity to their associated tubing string.

The control line protector 60 comprises a strap or band 22 similar to the strap 22 of the first embodiment, being formed at one end with a plurality of eyes 24 in which a trunnion 25 is pivotally mounted, and at the other end with eyes 26. The control line protector 60 further comprises a center block 52, which may be a steel casting, and a U-shaped cast bracket 54. The center block 52 is formed with eyes 26a dimensioned to cooperate with the eyes 26 and form therewith a releasable hinge in which a pin 30 can be inserted. The block 52 also comprises a trunnion 32 pivotally mounted therein, the trunnions 32 and 25 being interconnected by clamping screws 34. The center block 52 and the strap 22 clamp to the tubing 51, as will be described.

The bracket 54 is formed at each end with ears 56 cooperating with ears 58 on the center block 52 and further pins 30 connect the bracket 54 to the center block 52 by passing through aligned holes in the cooperating ears 56 and 58. The center block 52 has pockets to allow the control lines 38 to be captured between the block and the tubing strings 50 and 51 but not clamped.

To install the control protector of FIGS. 4 and 5 on the dual tubing string, the split pins 30 on the hinge side of the center block are removed and the center block is positioned between the strings. The control line 38 associated with the string 51 is positioned in the side pocket and the strap 22 is closed around the tubing string 51 and the associated pin 30 is then inserted through the cooperating eyes 26, 26a and locked in position. The pins 30 may be split pins of which the projecting ends can be readily deformed. The protector is then tensioned by tightening the screws 34 to a predetermined torque and is clamped thereby to the tubing string 51.

The control line 38 associated with the tubing string 50 is then positioned in its pocket, and the bracket 54 is closed around the string and the final pin 30 inserted and locked.

The control line protector when installed is clamped only to the tubing string 51, leaving the tubing string 50 free to move axially while the tubing strings are restrained against twisting one around the other. The control lines 38 are captive but are not clamped. The protector further acts as a spacer which maintains the center to center distance of the two tubing strings and prevents the control lines 38 from being trapped in the space between the tubing strings and also between the strings and the metal lined hole.

The use of the steel strap or band 22 in the protector ensures that the clamping loads are take up by hoop tension in the strap so that there are no joggles in the band or strap which could produce local bending and allow slackening due to creep.

FIG. 6 shows a further embodiment of control line protector particularly intended to protect a control line where the same passes over a coupling joint between adjacent tubing lengths in the tubing string and which is of larger external diameter than the basic string. Additionally this embodiment of the protector also acts as a positive centraliser limiting lateral movement of the string within the well casing.

Referring to FIG. 6, the control line protector 80 comprises two identical steel half members 81 and 82 which are hinged together by integrally formed bimetrically opposite hinges 83 each fitted with a removable split hinge pin 84. An inturned flange 85 at each axial end of half members provides vertical location of the protector 80 on the coupling joint which typically comprises a screwed collar as shown in FIGS. 1a and 1c. For installation, one of the hinge pins 84 is removed and the members 81 and 82 are opened out and offered around the coupling until the flanges 85 locate on the coupling and coined dogs 86 on each member 81 and 82 locate in slots diametrically positioned on each end of the coupling (not shown). The second hinge pin 84 is then inserted and both pins are locked by bending the lower ends which protrude through the hinge.

The dogs 86 prevent the protector 80 from rotating relative to the string. By straddling the coupling, the flanges 85 also prevent the protector 80 from axial movement along the string.

The external surfaces of the members 81 and 82 carry longitudinally extending flute members or fins 88 which are permanently attached thereto in any suitable manner, such as by welding or riveting. The fins 88 are arranged in diametrically opposed pairs and serve to maintain the tubing string centralized in the well casing. Also attached to the exterior of one or both of the members 81 and 82 is a steel tab 90 having a free end 92. Upon initial installation, the tab or tabs 90 are in the open position shown in broken lines. The control line 38 is then offered under the tab 90, and the tab is finally set by forcing its free end 92 through a slot 93 in an adjacent fin 88. The tab 90 is such that once its free end 92 has penetrated the slot 93 it bears against the external surface of the protector member underlying the fin 88 and is obliged to straighten out. Upon removal of the setting force the tab 90 attempts to return partway to its original position, but is restrained by the edge of the slot 93 which effectively holds it in place in the closed position. Depending on the form of the tab 90 adjacent to the control line 38 the control line may either be clamped to the body of the protector and hence restrained from axial movement, or it may be free to move axially, in this latter case the tab serving merely to locate the control line.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement or parts will readily suggest themselves to those skilled in the art and which are encompassed within the spirit of the invention and the scope of the appended claims.

What is claimed is:

1. A control line protector for application to a tubing string comprising:
   a partly cylindrical flexible strap;
   a second member co-operable with the strap to encircle the tubing string;
   means on the second member defining a channel for housing at least one control line and locating such at least one line relative to the protector;
   means connecting one end of the second member to the strap, said means comprising releasable hinge means having a removable pin; and
   means connecting the other end of the second member to the strap, said means comprising trunnions mounted one in each of the adjacent ends of the strap and the second member and clamping screws extending between the trunnions and adjustable for tensioning the strap and drawing same into clamping engagement with the tubing string.

2. The control line protector of claim 1, wherein the housing-defining means comprises a channel secured to the inner face of the second member.

3. The control line protector of claim 2, wherein a rubbing strip is secured to the outer face of the second member opposite the channel and projecting radially outwardly for engagement with a borehole casing to prevent at least one control line from being trapped between a tubing joint and the borehole casing.

4. The control line protector of claim 1, wherein the second member is provided in two portions which are hingedly connected by pins to the housing-defining member, one of said two portions having a recess therein for housing and locating at least one control line.

5. The control line protector of claim 4, wherein the housing-defining member is formed as a two-part member, the first of which parts is hingedly connected to the strap portions by the pins, and the second part of which is hinged to the first part whereby the first and second parts may be separated to allow at least one control line to be positioned in the recess.

6. The control line protector of claim 1, wherein the housing-defining means comprises a U-shaped clamping member mounted on the outer face of the second member.

7. The control line protector of claim 1, wherein the second member comprises:
   a spacer member positionable between the tubing string and a second tubing string; and
   a bracket hingedly connected to the spacer member for encircling the second tubing string.

8. The control line protector of claim 7, wherein housing-defining means are provided on said spacer member for housing and locating at least one control line adjacent both the tubing strings.

9. The control line protector of claim 1, wherein the strap comprises a flexible steel band, and the clamping screws are adapted to induce hoop tension in the strap when tightened within the trunnions for securing the control line protector to the tubing string.

10. The control line protector of claim 7, wherein the strap comprises a flexible steel band, and the clamping screws are adapted to induce hoop tension in the strap when tightened within the trunnions for securing the control line protector to the tubing string.

11. A control line protector for application over a tubing joint of a tubing string within a well casing for centralizing the tubing string within the well casing and for protecting at least one control line which extends along the tubing string, comprising:

two semi-cylindrical members releasably connected together and having multiple centralizing fins attached to the outer faces of said members;

means for securing at least one control line to at least one of the members, wherein such securing means comprises a tab affixed at one end to a semi-cylindrical member, with a free end engageable within a slot in a centralizing fin for clamping at least one control line between the tab and the outer face of the semi-cylindrical member; and means for locating the control line protector in a predetermined axial position with respect to the tubing string, wherein such locating means comprises inturned flanges on said members for straddling the tubing joint and preventing axial movement of the members by engagement with the tubing joint.

12. The control line protector of claim 11, wherein coined dogs project inwardly from each semi-cylindrical member for locating in slots positioned on each end of the tubing joint to prevent said members from rotating relative to the string.

* * * * *